United States Patent

Drower et al.

[11] 4,069,081
[45] Jan. 17, 1978

[54] METHOD FOR PROTECTIVE FILM LAMINATION WITH CURL CONTROL

[75] Inventors: Herbert M. Drower, Wilmette; Edison L. Rhyner, Chicago, both of Ill.

[73] Assignee: Sealtran Corporation, Chicago, Ill.

[21] Appl. No.: 711,491

[22] Filed: Aug. 4, 1976

[51] Int. Cl.² .................... B29C 19/02; B65C 9/25
[52] U.S. Cl. ................................ 156/272; 156/322; 156/324
[58] Field of Search ............... 156/324, 322, 272, 164, 156/380, 555, 582

[56] References Cited

U.S. PATENT DOCUMENTS

| Re. 9,905 | 10/1881 | Palmer | 156/582 |
|---|---|---|---|
| 2,361,527 | 10/1944 | Bacon | 156/272 |
| 3,108,034 | 10/1963 | Hannon | 156/582 |
| 3,180,778 | 4/1965 | Rinderspacher et al. | 156/322 |
| 3,322,593 | 5/1967 | Conti | 156/324 |
| 3,574,031 | 4/1971 | Heller, Jr. et al. | 156/272 |
| 3,660,190 | 5/1972 | Stroszynski | 156/272 |
| 3,901,758 | 8/1975 | Humphries | 156/582 |
| 3,959,567 | 5/1976 | Bradley | 156/555 |
| 3,976,528 | 8/1976 | James | 156/324 |

*Primary Examiner*—Douglas J. Drummond
*Attorney, Agent, or Firm*—Kinzer, Plyer, Dorn & McEachran

[57] ABSTRACT

A method for controlling curl in laminating a protective film having a heat-softenable adhesive surface onto a relatively flexible substrate document, in which the adhesive surface of the film is heated, the film and the substrate are then passed between two pressure rolls, and the laminate thus formed is maintained in contact with the pressure roll that engages the substrate through an appreciable arcuate distance after the laminate clears the other pressure roll to control longitudinal curl. The pressure rolls engaging the substrate and the film may be of convex and concave configuration, respectively, to minimize transverse curl. Radiant heating is preferably employed, together with limited pigmentation in the adhesive portion of the film.

11 Claims, 4 Drawing Figures

METHOD FOR PROTECTIVE FILM LAMINATION WITH CURL CONTROL

BACKGROUND OF THE INVENTION

There are many instances in which it is disirable to laminate a transparent or partially transparent protective film onto a data-bearing substrate. For example, paper menus that are protected with laminated protective films are often improved in initial appearance and remain usable for much longer periods than those which do not have such protection. Documents and photographs can be preserved for historical or sentimental purposes much longer than would otherwise be possible if covered with a protective transparent film covering laminated to them. Even plastic articles, such as identification cards, signs, and the like, can be materially increased in longevity by laminating a tough, abrasion resistant transparent film onto their surfaces. All such articles are referred to generally, in this specification, as "documents".

One commonly used transparent protective film is of composite construction, having one surface formed of a tough, abrasion resistant polyester resin, the opposite surface comprising a material that serves as an adhesive for bonding the film to a substrate. The most common adhesive material is polyethylene. These composite polyester-polyethylene films have been successfully used for the protection of a wide variety of articles, including photographs, menus, identification cards, directional signs, and others.

One prevalent problem in laminating transparent protective films to various objects, where the bonding surface is one which requires heating to obtain good adherence, as in the case of polyethylene, is the maintenance of effective control of the heating of the adhesive surface of the film. With insufficient heating, adherence is likely to be inadequate, and the film may tend to peel away from the substrate that it is supposed to protect. On the other hand, if the polyethylene or other adhesive material on the inner bonding surface of the film is heated too much, it may tend to flow when pressure is applied to laminate the film to a substrate, fouling the laminating apparatus. Control of the heating of the adhesive surface of the protective film is thus important to the laminating process and apparatus, particularly in high volume operations.

Another substantial problem is presented in those instances in which the substrate is relatively flexible, as is frequently the case. The heating of the protective film immediately prior to pressure lamination tends to expand the film as the laminating process proceeds. When the film subsequently cools, its contraction may cause the completed laminate to curl upwardly on the side to which the film has been applied. This problem is particularly noticeable in laminated articles having a protective film on only one side, but may even occur where the film is applied to both sides of a substrate, due to minor variations in the film thickness, differences in the heating of the two laminating films applied to opposite sides of the substrate, and other factors. The resulting curl in the laminated articles, which may occur in a transverse direction as well as in a longitudinal direction, is frequently quite objectionable.

SUMMARY OF THE INVENTION

It is a principal object of the present invention, therefore, to provide a new and improved method for laminating a protective film to a relatively flexible document substrate that effectively and inherently controls the curl of the resulting laminated article, to the point of complete elimination of all curl.

Another object of the invention is to provide a new and improved method for controlling or eliminating curl in a laminate formed of a protective film applied by heat and pressure to a flexible document substrate that can be readily adjusted to compensate for films and substrates of differing thickness and flexibility.

A related object of the invention is to provide a new and improved heat-pressure laminating method for applying a protective film to a substrate that maximizes the efficiency of a radiant heat source used to heat the film prior to lamination and concentrates the heating of the film at the film surface which is bonded to the substrate.

A further object of the invention is to provide a new and improved method for controlling curl in laminating a protective film to a flexible document substrate, with improved efficiency of the heating of a heat-actuated adhesive surface on the film, that is simple and economical in all respects.

Accordingly, the invention relates to a method of laminating a protective film onto a document substrate, without producing appreciable curl in the finished laminate, comprising the following steps:

A. preparing a composite protective film comprising an outer layer of tough, transparent abrasion resistant resin and an inner layer of transparent thermoplastic bonding resin, including the addition of a limited quantity of a radiant-heat-blocking pigment to the bonding resin in an amount sufficient to increase the radiant heat absorption of the bonding resin and to decrease its radiant heat transmission but small enough to preclude material degradation of the transparency of the composite film to visible light;

B. heating the bonding resin layer of the composite film by directing radiant heat to impinge directly upon the bonding resin;

C. laminating the composite protective film to a substrate by passing the composite film and the substrate between first and second pressure rolls, promptly after heating of the adhesive, with the adhesive surface of the film in engagement with an inner surface of the substrate, the outer surface of the film engaging the first pressure roll, and the outer surface of the substrate engaging the second pressure roll; and D. maintaining the resulting laminate in engagement with the second pressure roll through an appreciable arcuate distance on the second pressure roll after clearing its engagement with the first pressure roll.

DESCRIPTION OF THE PREFERRED EMBODIMENTS

Figure 1:
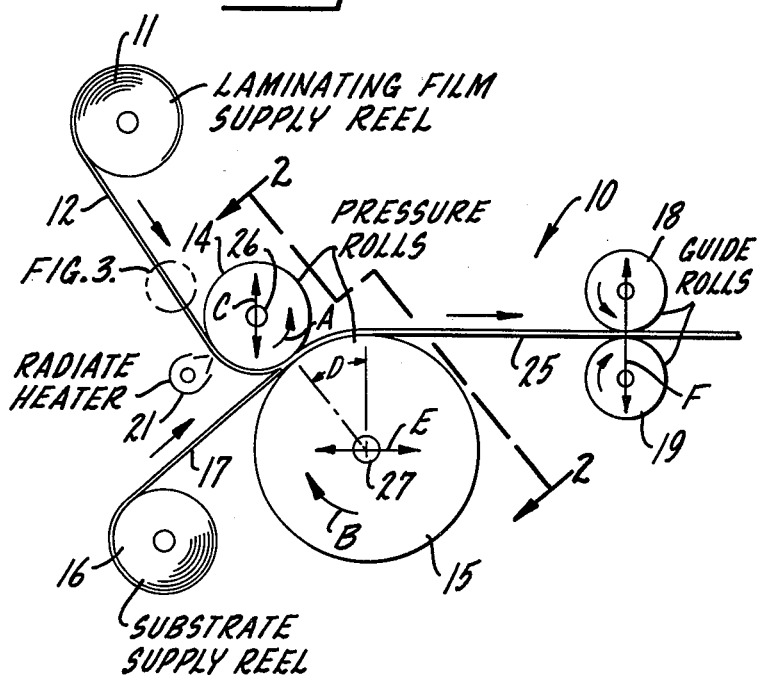
FIG. 1 illustrates the principal components of a heat lamination apparatus.
Figure 2:
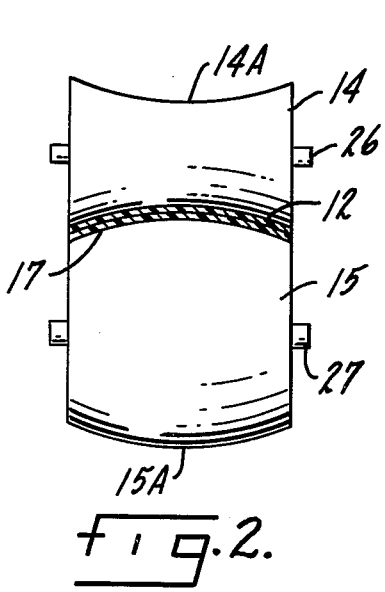
FIG. 2 is a detail view taken approximately along line 2—2 in FIG. 1.

FIGS. 1 and 2 illustrate a first form of laminating apparatus 10 effectively usable to carry out the laminating method of the invention. The laminating apparatus 10 is shown in essentially schematic form because the individual components are well-known in the art.

The laminating apparatus 10 of FIGS. 1 and 2 comprises a supply 11 of laminating film 12, in this instance shown as a reel from which the film 12 is fed into the nip between the two pressure rolls 14 and 15. Apparatus 10 further comprises a second supply reel 16 from which a document substrate 17 is fed into the nip between the pressure rolls 14 and 15. The substrate 17 may, for example, comprise a continuous web of paper or plastic previously printed with appropriate data such as the contents of a menu, advertising or promotional material, a photograph, a reproduction of a historical document, or almost any other subject matter. Apparatus 10 also includes appropriate drive means (not shown) for rotating the pressure rolls 14 and 15 in the directions indicated by the arrows A and B respectively. The drive arrangement should be such that the peripheral surfaces of the two pressure rolls have approximately the same speed.

Two guide rolls 18 and 19 are included in apparatus 10 and are located on the opposite side of pressure rolls 14 and 15 from the supply reels 11 and 16. The guide rolls may be idlers, in which case no drive is required for them. On the other hand, the rolls 18 and 19 may also be employed as tensioning rolls to pull a laminating material through the pressure rolls 14 and 15 in the course of a laminating operation, as described below, in which case the apparatus 10 should include an appropriate drive for the rolls, rotating rolls 18 and 19 at a peripheral speed approximately equal to or slightly greater than the peripheral speed of the pressure rolls 14 and 15.

A radiant heating source 21 is incorporated in the laminating apparatus 10 immediately adjacent the pressure roll 14 that engages the outer surface of laminating film 12. For example, heater 21 may comprise one or more infra-red heat lamps and an appropriate reflector for concentrating the heat from the lamps on the inner surface of the laminating film 12, the surface that is bonded to substrate 17. Preferably, a focussing reflector is employed for maximum concentration of heating at the adhesive surface of the film.

Figure 3:
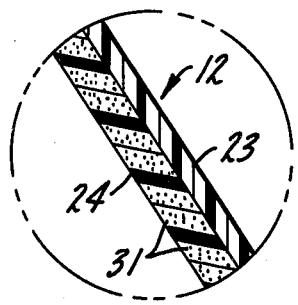
FIG. 3 is a sectional view, on an enlarged scale, of a preferred form of transparent film employed in the apparatus of FIGS. 1 and 2.

FIG. 3 affords a sectional view of a preferred form for the transparent laminating film 12. As shown therein, the laminating film 12 is of composite construction, including two layers 23 and 24. The outer layer 23 is formed of a tough, abrasion resistant thermosetting polyester resin such as the resin polyethylene terephthalate available commercially under the tradename "Mylar". The inner bonding layer 24, comprising a coating on one surface of the polyester film 23, is preferably formed of polyethylene. In a typical laminating film 12, the polyester layer 23 may have a thickness of 0.0005 inch and the bonding layer of polyethylene may have a thickness of 0.001 inch. Films of this composite construction are commercially available from a number of different suppliers, in widely varying thicknesses for each of the layers 23 and 24.

In the operation of laminating apparatus 10, and in the performance of the method of the present invention, the composite laminating film 12 is fed from the supply reel 11 and into engagement with the first pressure roll 14. The orientation of the film 12, as it passes from reel 11 to roll 14, is such that the polyester outer surface 23 engages roll 14 and the polyethylene coated inner bonding surface 24 (FIG. 3) faces downwardly toward substrate 17. The radiant heater 21 heats the adhesive inner surface of the protective film; heater 21 should be positioned adjacent to the nip between pressure rolls 14 and 15 to avoid undesired loss of heat that might otherwise be wasted in useless general heating of apparatus 10. However, some spacing between the pressure roll nip and heater 21 is permissible, depending on the speed of movement of film 12 and other relevant factors.

The substrate 17 is fed from its supply reel 16 into the nip between pressure rolls 14 and 15, where the heated bonding surface 24 on film 12 is pressed against and laminated to the substrate. As is apparent from FIGS. 1–3, the unheated outer surface 23 of film 12 contacts pressure roll 14 whereas the outer surface of substrate 17 engages pressure roll 15.

Beyond the pressure rolls 14 and 15, the laminate 25 formed by pressing the heated film 12 against the substrate 17 continues its movement between the guide rolls 18 and 19 (FIG. 1). These guide rolls are positioned so that the laminate 25 remains in engagement with the second pressure roll 15 through an appreciable arcuate distance D after the laminate 25 has cleared its engagement with the first pressure roll 14. By thus maintaining the laminate 25 in engagement with the second pressure roll 15, the roll that engages substrate 17, for an appreciable circumferential distance, any tendency of laminate 25 to curl longitudinally after it cools is effectively controlled. By appropriate adjustment of the relative positions of the pressure rolls 14 and 15, with respect to the path followed by the laminate after it leaves the pressure rolls, the curl of the cooled laminate can be held to a minimum and may be eliminated entirely.

To provide effective control of longitudinal curl, and to allow apparatus 10 to be used with films and substrates of varying thickness and flexibility, the laminating apparatus may include means for adjusting the relative positions of the pressure rolls. Typically, the shaft 26 of pressure roll 14 may be mounted in bearings permitting vertical adjustment of this pressure roll as indicated by the arrows C, or the shaft 27 for pressure roll 15 may be mounted to provide for horizontal position adjustment as indicated by arrows E (FIG. 1), or both adjustments may be provided. Alternatively, apparatus 10 may be constructed to provide for adjustment of the positions of guide rolls 18 and 19 as indicated by arrows F. These adjustments, which can be effected by any suitable mechanical arrangement make it possible to vary the angular distance D, and hence the dircumferential distance, through which the laminate 25 is maintained in continuing contact with pressure roll 15. This makes it possible to effect precise control of longitudinal curl for a wide variety of different films and substrates that may vary substantially in thickness, flexibility, and thermal expansion characteristics.

Polyester film, in the process of manufacture, is usually stretched both longitudinally and transversely (biaxially) immediately after initial extrusion. Because the polyester layer 23 of composite film 12 (FIG. 3) is inevitably heated to a considerable extent in laminating apparatus 10, there is some tendency toward subsequent contraction of the film in the transverse direction, due to "plastic memory," which may produce curl in the laminate 25 when the laminate cools. This transverse curl is usually less than longitudinal curl, because little or no stretching force is applied transversely of the film, but it can be objectionable in some instances.

To counteract transverse curl, when present, pressure roll 15 may be formed with a convex surface 15A as shown in FIG. 2. With this configuration, transverse contraction of the protective film on cooling straightens the transverse curvature induced in laminate 25 by the convex surface of roll 15, affording a flat laminate output. Of course, the mating surface 14A of roll 14 should have a corresponding concave configuration to assure effective bonding across the full width of laminate 25.

Because the laminating film 12 must be essentially transparent in most applications, much of the radiant heat from device 21 may pass through the inner bonding layer 24 of film 12. This represents an undesired waste of heat. The heating effect on film 12 can be more efficiently localized in its adhesive surface 24 by adding limited pigmentation 31 to that layer of the composite film. Pigmentation of the bonding resin (polyethylene) layer 24 increases its radiant heat absorption and limits the heating of the outer protective layer 23, affording better heating efficiency. Pigmentation also aids in reducing curl because it limits the heating of the polyester layer 23 of film 12 that is the source of the curl. Pigmentation 31 can be effective even at concentrations as low as about one percent by volume of bonding layer 24; the amount of pigmentation should be low enough to avoid material degradation of the transparency of composite film 12. Finely divided zinc oxide is one suitable pigment; another pigment which may be employed is titanium dioxide.

Figure 4:
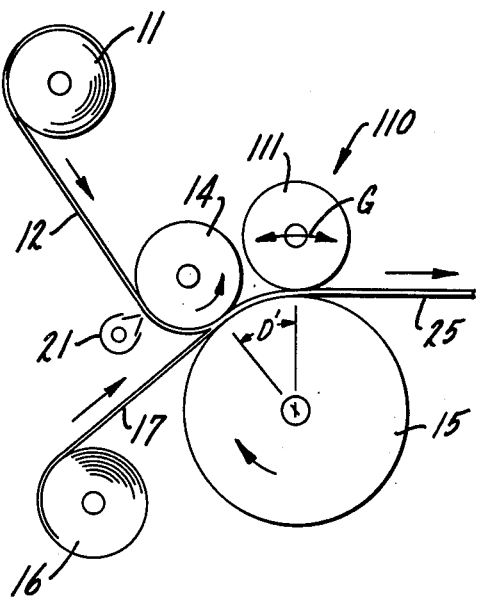
FIG. 4 illustrates the basic components of another form of apparatus capable of carrying out the inventive method.

FIG. 4 illustrates a modified form of laminating apparatus 110 that may be employed instead of the laminating apparatus 10 of FIG. 1. In the apparatus 110, the protective film 12 is again fed from a supply reel 11 into the nip between two pressure rolls 14 and 15. A radiant heater 21 is again provided to heat the adhesive surface of film 12 immediately prior to the passage of the film into the area between the pressure rolls. As before, the substrate 17 is shown as fed from a substrate supply reel 16 into the space between the two pressure rolls 14 and 15.

In apparatus 110, there is a single guide roll 111, located opposite pressure roll 15 at a position on the path of the laminate 25 at an appreciable arcuate distance beyond pressure roll 14. Guide roll 111 maintains laminate 25 in engagement with pressure roll 15 through an appreciable arcuate distance D' after the laminate has cleared its engagement with the first pressure roll 14. This affords the same curl-prevention effect as in the previously described apparatus 10. Apparatus 110 may include means for adjusting the location of guide roll 111 around the periphery of pressure roll 15 to adjust the extent of the arcuate distance D' and thereby control the curl-reduction effect in compensation for changes in the thickness, flexibility, or thermal expansion characteristics of either film 12 or substrate 17. The adjustment of the position for roll 111 is along an arcuate path generally indicated by the arrows G. With this construction, the positions for pressure rolls 14 and 15 may remain essentially constant, preferably with some resilient biasing means urging the two pressure rolls toward each other at their point of tangency.

In the foregoing description of specific embodiments 10 and 110, it is assumed that film 12 and substrate 17 are both continuous webs. Individual sheets, with appropriate sheet feed means, can be used for either the protective film or the substrate or both. The protective film may be entirely transparent or it may carry pre-printed data as desired. Appropriate electrical controls can be provided for heater 21 to vary the heat output in accordance with variations in the properties of the film bonding layer 24. In either of the apparatus embodiments 10 and 110, when difficulty is encountered in eliminating longitudinal curl, the diameter of roll 15 can be reduced, increasing the reverse curvature through which the laminate is bent and further reducing the curl of the finished product. Stationary guides can be employed, instead of rolls 18, 19 (FIG. 1) or 111 (FIG. 4) to hold laminate 25 in contact with an appreciable circumferential portion of roll 15. All of these modifications are readily accomplished, and hence have not been illustrated.

We claim:

1. The method of laminating a protective transparent film to a document substrate, without producing appreciable curl in the finished laminate, comprising the following steps:

A. preparing a composite protective film comprising an outer layer of tough, transparent abrasion resistant resin and an inner layer of transparent thermoplastic bonding resin, including the addition of a limited quantity of a radiant-heat-blocking pigment to the bonding resin in an amount sufficient to increase the radiant heat absorption of the bonding resin and to decrease its radiant heat transmission but small enough to preclude material degradation of the transparency of the composite film to visible light;

B. heating the bonding resin layer of the composite film by directing radiant heat to impinge directly upon the bonding resin;

C. laminating the composite protective film to a substrate by passing the composite film and the substrate between first and second pressure rolls, promptly after heating of the adhesive, with the adhesive surface of the film in engagement with an inner surface of the substrate, the outer surface of the film engaging the first pressure roll, and the outer surface of the substrate engaging the second pressure roll; and D. maintaining the resulting laminate in engagement with the second pressure roll through an appreciable arcuate distance on the second pressure roll after clearing its engagement with the first pressure roll.

2. The lamination method of claim 1 in which the pigment employed is a white pigment.

3. The lamination method of claim 1 in which the pigment employed is selected from the class consisting of zinc oxide and titanium dioxide.

4. The lamination method of claim 1 in which the concentration of the pigment in the bonding resin is of the order of one percent.

5. The lamination method of claim 1 including the additional preliminary step of adjusting the relative positions of the pressure rolls to vary said arcuate distance in accordance with the thickness, flexibility, and thermal expansion characteristics of the protective film.

6. The lamination method of claim 1 including the additional preliminary step of adjusting the relative positions of the pressure rolls to vary said arcuate distance in accordance with the thickness, flexibility, and thermal expansion characteristics of the substrate.

7. The lamination method of claim 1 including the additional step of adjusting an auxiliary guide, located on the output side of the pressure rolls, to vary said arcuate distance in accordance with the thickness, flexibility, and thermal expansion characteristics of the protective film.

8. The lamination method of claim 1 including the additional step of adjusting an auxiliary guide, located at the output side of the pressure rolls, to vary said arcuate distance in accordance with the thickness, flexibility and thermal expansion characteristics of the substrate.

9. The lamination method of claim 1 including the additional step of maintaining the laminate in a transverse curved configuration, concave toward the substrate side, during steps B and C.

10. The lamination method of claim 1 in which step B is effected by directing infra-red radiation to impinge directly upon the pigmented bonding resin layer.

11. The lamination method of claim 10 including the further step of focussing the infra-red radiation on the outer surface of the pigmented bonding resin layer.

* * * * *